(12) United States Patent
Magana et al.

(10) Patent No.: US 9,683,481 B1
(45) Date of Patent: Jun. 20, 2017

(54) DUAL PASS INTERCOOLED SUPERCHARGER

(71) Applicant: Edelbrock, LLC, Torrance, CA (US)

(72) Inventors: Chad Magana, Lakewood, CA (US); Robert Simons, Irvine, CA (US)

(73) Assignee: Edelbrock, LLC, Torrence, CA (US)

( * ) Notice: Subject to any disclaimer, the term of this patent is extended or adjusted under 35 U.S.C. 154(b) by 0 days.

(21) Appl. No.: 15/077,830

(22) Filed: Mar. 22, 2016

Related U.S. Application Data (60) Provisional application No. 62/307,349, filed on Mar. 11, 2016.

(51) Int. Cl.
*F02B 29/04* (2006.01)
*F02B 33/38* (2006.01)

(52) U.S. Cl.
CPC ...... *F02B 29/0406* (2013.01); *F02B 29/0475* (2013.01); *F02B 33/38* (2013.01)

(58) Field of Classification Search
CPC .... F02B 33/38; F02B 29/046; F02B 29/0418; F02B 29/0437; F02B 29/04; F02B 29/0462; F02B 29/0475
USPC .................................................. 123/563, 54.4
See application file for complete search history.

(56) References Cited

U.S. PATENT DOCUMENTS

| | | | | |
|---|---|---|---|---|
| 6,029,637 A | * | 2/2000 | Prior | F02B 29/0412 123/184.34 |
| 6,227,179 B1 | * | 5/2001 | Eiermann | F02B 29/0462 123/563 |
| 6,837,195 B2 | * | 1/2005 | Suwazono | F02B 29/0475 123/54.4 |
| 6,942,017 B2 | * | 9/2005 | Gokan | F02B 29/0462 123/563 |
| 8,464,696 B2 | * | 6/2013 | Liimatta | F02B 29/0462 123/559.1 |

FOREIGN PATENT DOCUMENTS

| | | | | |
|---|---|---|---|---|
| FR | WO 03102396 A1 | * | 12/2003 | ......... F02B 29/0462 |
| JP | 57171027 A | * | 10/1982 | |
| SE | WO 2010062241 A1 | * | 6/2010 | ......... F02B 29/0462 |
| WO | WO 2015179048 A2 | * | 11/2015 | ............. F02B 33/36 |

OTHER PUBLICATIONS

WO 03102396 English Translation.*

* cited by examiner

*Primary Examiner* — Thai Ba Trieu
*Assistant Examiner* — Jessica Kebea
(74) *Attorney, Agent, or Firm* — Buchalter Nemer (57) ABSTRACT

The dual pass intercooled supercharger includes a supercharger and intercooler. The system is configured such that air leaving the supercharger traverses the intercooler from one side to an opposing side two or more times.

20 Claims, 7 Drawing Sheets

DUAL PASS INTERCOOLED SUPERCHARGER

PRIORITY

This application claims priority to U.S. Application No. 62/307,349, filed Mar. 11, 2016, which is incorporated by reference in its entirety into this application.

BACKGROUND

Conventionally, superchargers are used to get additional power from an engine. The supercharger delivers additional air so the engine can burn additional fuel. The additional air is provided by compressing the air before it enters the engine. When the air is compressed, however, the temperature of the air rises. The hotter air is less dense and more volatile. Therefore, an intercooler may be used between the supercharger and the engine to cool the air to the desired temperature before injecting it into the engine.

Figure 1:
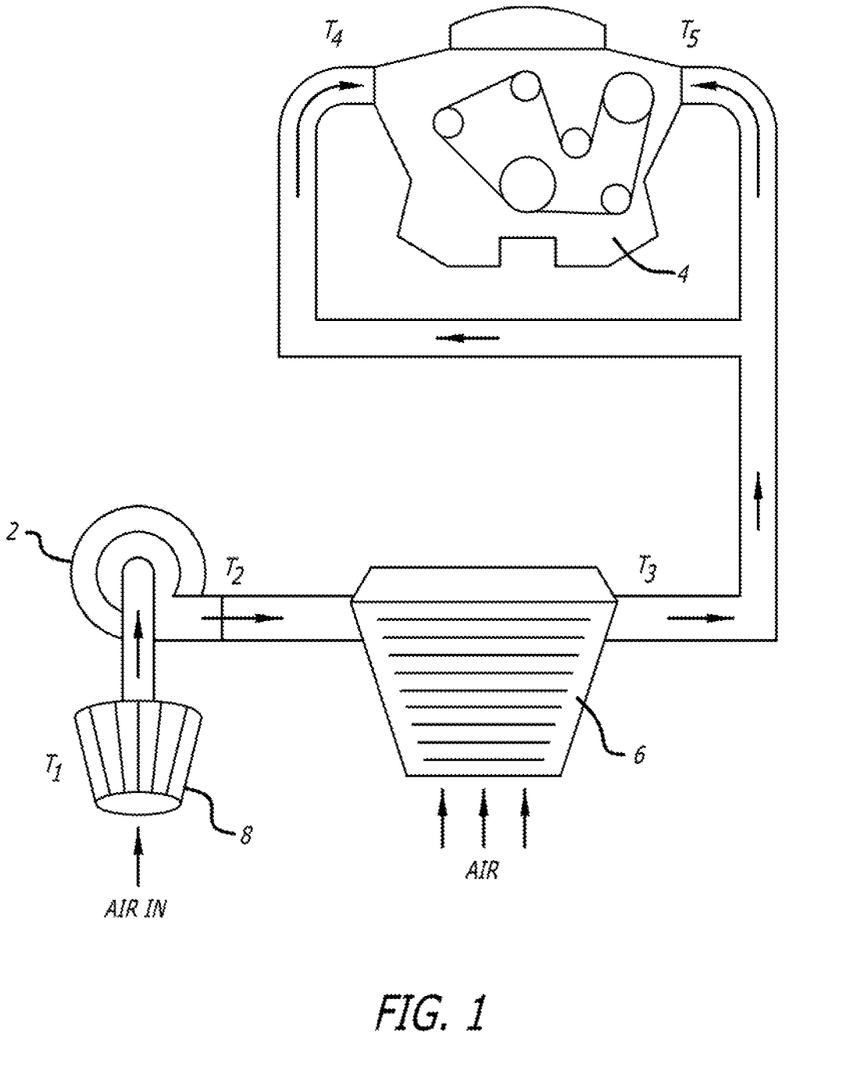
FIGS. 1-3 illustrate and conventional supercharger systems.

FIG. 1 illustrates an exemplary air to air intercooler system in conjunction with a supercharger. As shown, the system includes a supercharger 2 used to compress the air that is received from the environment, through the air filter 8. The air is then directed into the engine 4. In the exemplary air to air intercooler, the air out of the supercharger is passed through an air to air heat exchanger 6. The system takes in air at a temperature T1 equivalent to the outside environment of the vehicle. As the air is compressed in the supercharger, the temperature of the air rises to T2 (T2>T1). The air is then passed through the intercooler to reduce the air volatility and increase the oxygen level by increasing the air density and reducing the temperature to T3 (T2>T3>T1). Conventionally, a series of piping is used to move the air through the system. Before the air reaches the engine, the air may pass by an external portion of the engine or other part of the vehicle that is warm, thus reducing the effect of the intercooler. Therefore, by the time the air reaches the engine, it may be at a temperature T4 or T5 depending on its path (T4 and T5>T3).

Figure 2:
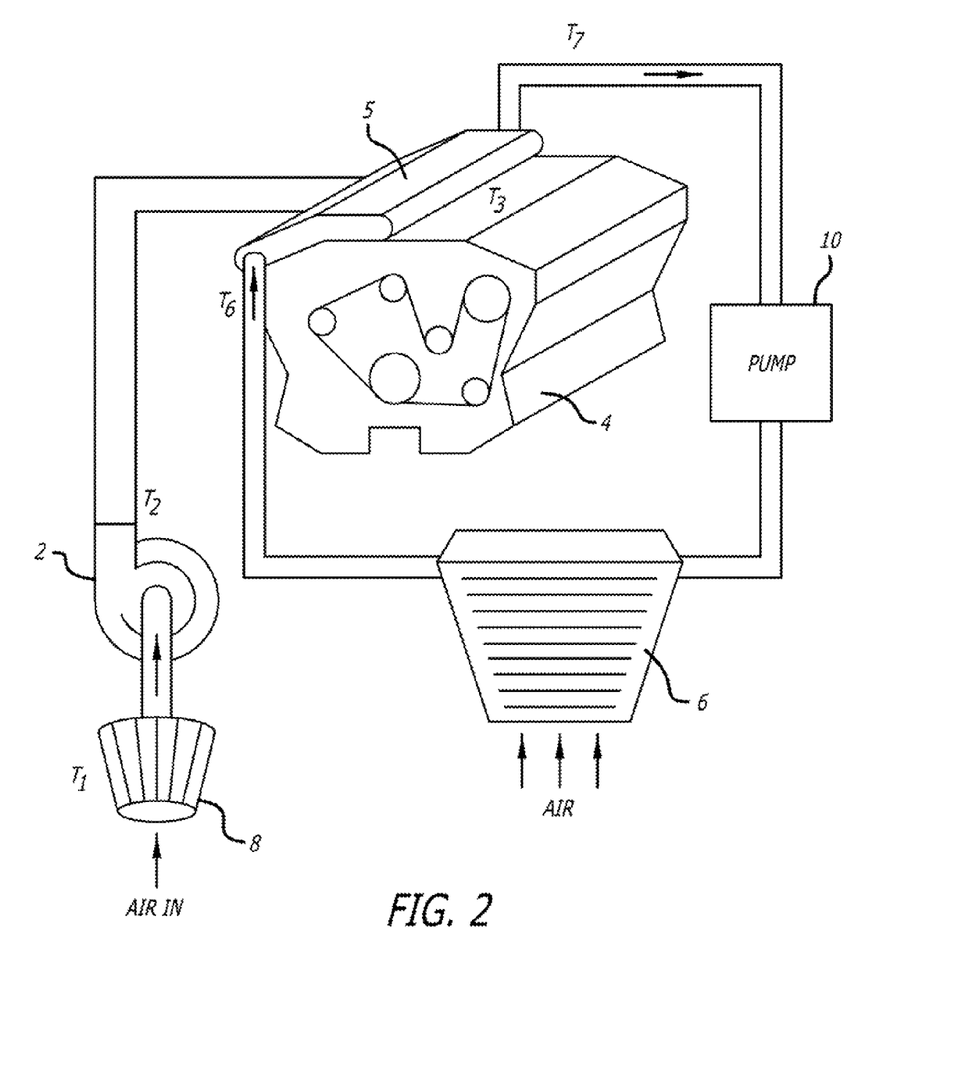

FIG. 2 illustrates an exemplary air to water intercooler system in conjunction with a supercharger. This system comprises the same supercharger 2 and engine 4, but incorporates an air to water intercooler 5. In this configuration, the warm air leaving the supercharger enters the intercooler 5 where water at a reduced temperature T6 is passed by the incoming air. The air temperature is then reduced to T3 before it enters the engine. The warm water leaving the intercooler 5 is then cooled through the heat exchanger 6, and a pump 10 is used to move the water through the system. This configuration provides more freedom in the configuration and positioning of the intercooler as compared to the air to air system of FIG. 1, since the intercooler does not need to be positioned at the front of the vehicle.

Figure 3:
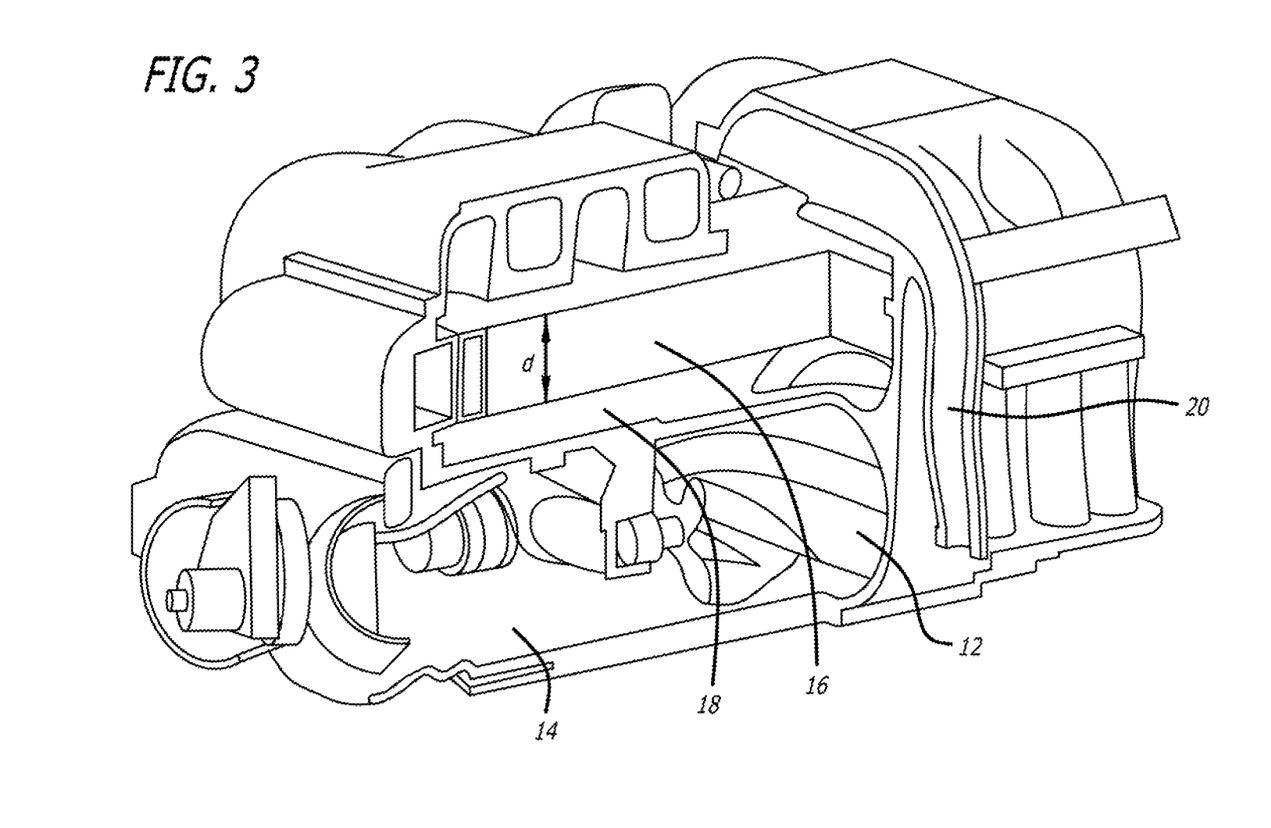

FIG. 3 illustrates an exemplary conventional system in which the supercharger is integrated with the intercooler and positioned proximate the engine intake. The supercharger 12 defines a central chamber 14. The intercooler 16 is positioned at the outlet 18 of the supercharger 12 chamber 14. The exiting air passes through the heat exchanger 16 before entering the engine through intake runners 20. As shown in FIG. 3, a diameter or cross sectional length of the runner may decrease from the intercooler exit to the engine intake. Therefore, the runner 20 may inwardly taper toward the intercooled supercharger exit.

However, the space between the compressor and the engine is limited. Therefore, the ability to control or achieve a desired temperature is similarly constrained. Typically, in order to achieve the optimal intake temperature for the engine, the depth, d, of the intercooler must be increased to provide sufficient cooling out of the supercharger. In some vehicle configurations, such an extension is unavailable or undesirable as the space is limited between the engine and the hood of the vehicle. In order to optimize the reduced temperature, additional space is required, either by raising the hood or removing a portion of the hood and extending the supercharger through the hood surface. Alternatively, the intercooler may be moved away from the engine intake for the detriment of a higher temperature at the engine intake.

SUMMARY

A dual pass intercooled supercharger is described herein including a supercharger; and an intercooler in fluid communication with an exit of the supercharger, the intercooler configured as a dual pass heat exchanger.

A method of compressing and cooling air to an engine intake is also disclosed including compressing the air in a supercharger; passing the air exiting the supercharger through a first portion of an intercooler in fluid communication with an exit of the supercharger; exiting the air from the intercooler into a common chamber; and passing the air from the common chamber through a second portion of the intercooler different from the first portion of the intercooler. A heat exchange medium of the intercooler may be in fluid communication between the first portion and the second portion of the heat exchanger.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

The intercooler is used to cool the air to a desired reduced temperature to optimize the power from the engine. However, conventional systems must increase the depth of the heat exchanger in order to lower the temperature to an optimal level. Exemplary embodiments described herein comprise a dual pass intercooler. The configuration permits the compressed air from the supercharger to pass the same coolant two or more times to provide additional heat removal from the air. Exemplary embodiments may therefore achieve the same cooling effect with a reduced intercooler depth.

Figure 4:
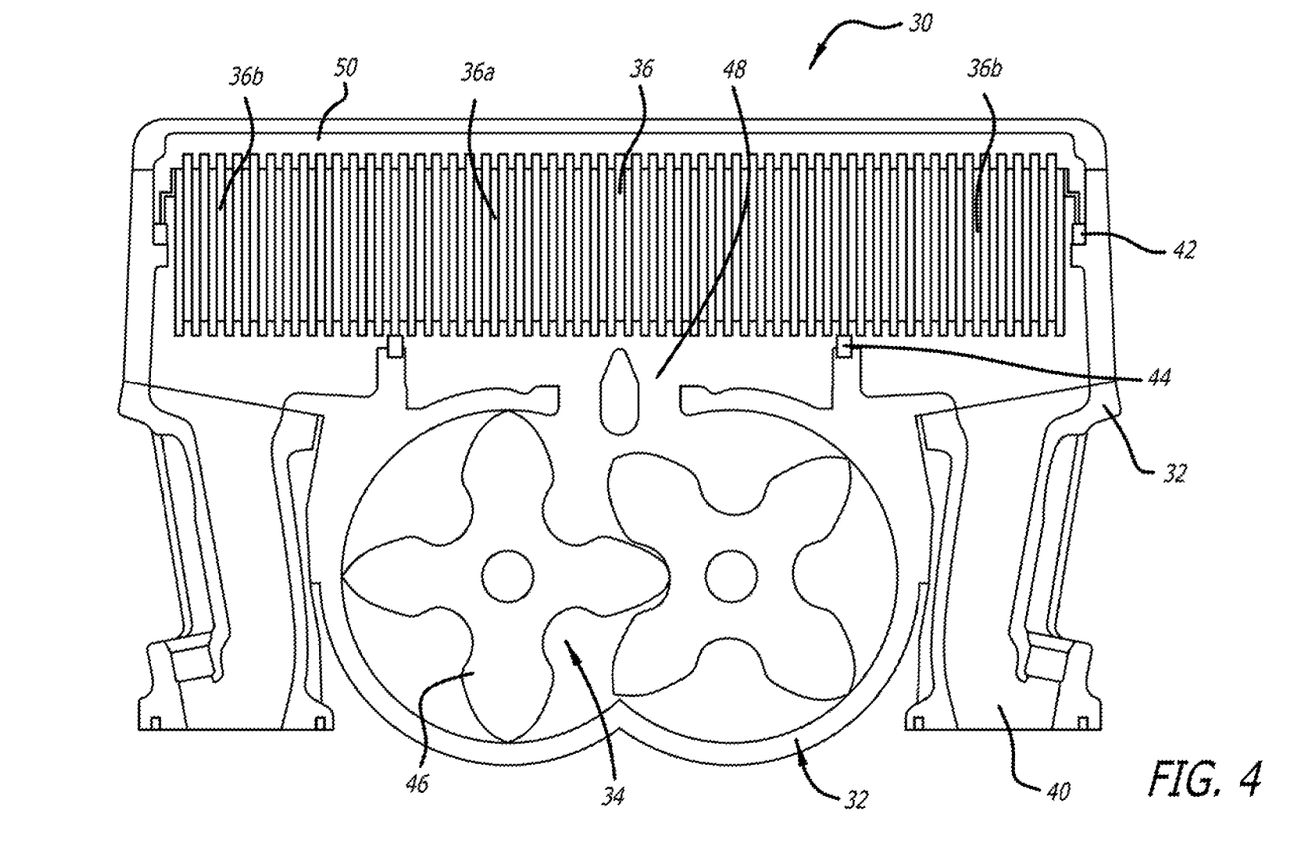
FIG. 4 illustrates a cross section of an exemplary dual pass intercooled supercharger according to embodiments described herein.

FIG. 4 illustrates a cross section of an exemplary dual pass intercooled supercharger 30 according to embodiments described herein. Exemplary embodiments comprise a housing 32 that encloses and directs air from the supercharger chamber 34 to the intercooler 36 and out the runners 40 to the engine (not shown).

In an exemplary embodiment, the supercharger 34 comprises a chamber defined by housing have an air inlet and air outlet. The chamber accommodates a roots blower 46. The supercharger compresses the air to the engine by controlling a rate differential from the air intake through the roots blower to air exhaust to the engine. Other compressor devices and configurations may also be used. For example, supercharger 34 may comprise a screw compressor.

In an exemplary embodiment, the supercharger 34 may be a front drive, rear inlet, having a roots style blower. In this configuration, the supercharger pulley may be driven off of the front drive system, with the inlet on the opposite or rear side of the engine. Therefore, the air enters at the back of the supercharger, so that the air inlet system and the drive system are completely separated.

In an exemplary embodiment, the supercharger 34 may be a front inlet, rear drive, having a roots style blower. In this case, a mechanism is used to transmit the rotational torque to the back of the engine so that the air may enter at the front. This mechanism may be a jack shaft. This configuration allows the air inlet to be at the front, giving a better inlet air path.

Figure 7:
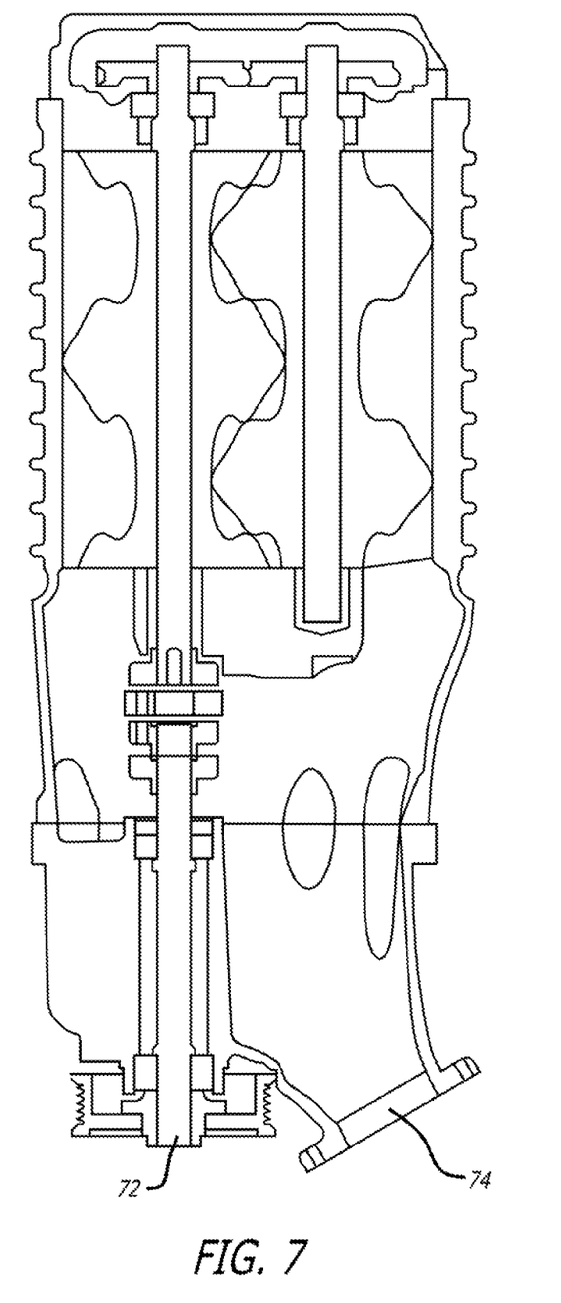
FIG. 7 illustrates a cross sectional view of an exemplary supercharger according to embodiments described herein for use with the intercooler system.

In an exemplary embodiment, the supercharger 34 may be a front inlet, front drive, having a roots style blower. For example, FIG. 7 illustrates a cut away of an exemplary supercharger blower cut along the rotor axes. In this configuration, the drive pulley 72 and the air inlet 74 are on the same side of the supercharger at the front of the engine. This configuration provides efficient torque transmission and a short and efficient air inlet path.

The air leaving the supercharger is then directed through the intercooler 36. The intercooler is configured such that the supercharger air traverses a first portion of the intercooler through a first volume. The air enters the intercooler along a portion of a first side and exits along an opposing second side. The second side of the intercooler defines a portion of a perimeter edge of a second chamber between the heat exchanger and the supercharger housing. The air passes through the second chamber and through a separate portion of the intercooler. The air enters the second portion of the intercooler from the second side (i.e. the exit side from the first air pass). The air then exits the intercooler a second time on the first side. The second pass of the air is through a second volume different from the first volume, such that the air passes through different lengths of the intercooler. Once the air has traversed the intercooler twice, the cooled air travels along the runners 40 to the engine.

As shown in FIG. 4, the dual pass intercooled supercharger includes an integrated intercooler length. The intercooled supercharger includes a central chamber 48 exiting from the supercharger chamber 34 and before the intercooler 36. The central chamber is the intercooler air inlet. A perimeter around the first portion is sealed at the first chamber. The seal 44 prevents air from bypassing the intercooler and traveling directly from the supercharger outlet into the engine inlet. The seal 44 separates a first portion of the intercooler 36a from the second portion of the intercooler 36b at an edge of the central chamber. Similarly, the second portion of the intercooler 36b is sealed relative to the housing 32 to prevent the air on the second pass from bypassing the intercooler. In an exemplary embodiment, the intercooler comprises two common chambers on opposing sides of the intercooler. The first chamber, or central chamber 48, is positioned between a portion of the length of the intercooler and the exit of the supercharger. A second chamber 50 is positioned on an opposing side of the intercooler from the first chamber. The second chamber 50 is adjacent the second side of the intercooler and extends along an entire length or approximately along the entire surface area of the intercooler second side. The second chamber is across both the first portion 36a and second portion 36b of the intercooler. The air then exits on a peripheral region of the first side of the intercooler through an area between the first portion and the housing. In an exemplary embodiment, the dual pass intercooled supercharger comprises one intake through the common chamber and a plurality of exits through runners 40. The exit portions are on opposing sides of the inlet portion. Therefore, the air enters the intercooler along an interior portion of the intercooler, travels outward through the second chamber and portions of the air exits through different second portions of the intercooler along opposing sides of the interior portion. The second seal 42 circumscribes the intercooler and seals the intercooler along a perimeter of the housing. The first seal 44 circumscribes the first portion of the intercooler and seals the first portion of the intercooler at the inlet chamber 48 from the outlet chambers coupled to runners 40.

The housing may also comprise a bypass valve that permits the air entering the supercharger 52 to circulate around the rotor. The air from the exit of the blower is allowed to re-enter the inlet of the blower through the bypass. This may be used for pressure equalization and minimize parasitic losses.

The dual pass intercooled supercharger includes an integrated intercooler length, such that water (or other heat exchange medium) enters at one or more points and exits at one or more other points. The entire cooling medium volume of the intercooler may be in fluid communication, regardless of the number of inlets and outlets of the cooling medium. For example, the fluid medium is in fluid communication across the first portion and second portion of the intercooler. In an exemplary embodiment, the heat exchange medium is water. The heat exchange medium enters the intercooler at two locations, with at least one at each of the second portions of the intercooler. The heat exchange medium exits the intercooler at a location within the first portion of the intercooler. Therefore, the second pass of air from the second chamber 50 to the runners 40 encounters the cooler heat exchange interface from that of the first pass of air from the inlet chamber 48 to the second chamber 50. In an exemplary embodiment, the intercooler is generally planar, such that the first portion and the second portion are coextensive along the depth dimension. In an exemplary embodiment, the first portion and second portion overlap along a dimension generally parallel to the air flow direction through the intercooler as seen in profile.

Figure 6:
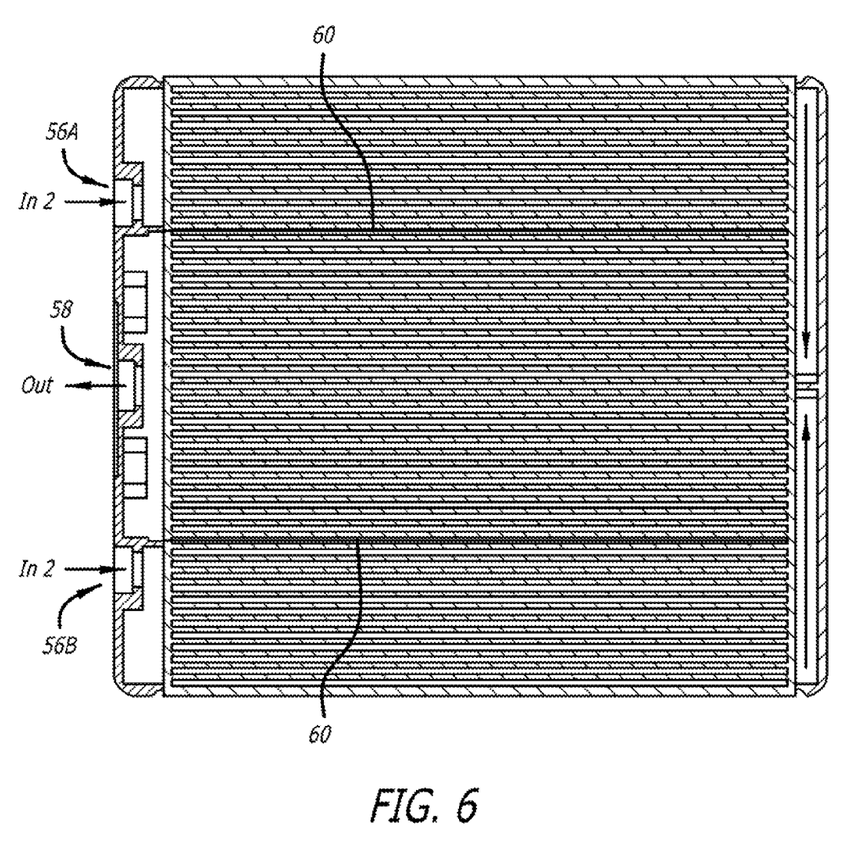
FIG. 6 illustrates a top perspective view of an exemplary dual pass intercooler according to embodiments described herein.

FIG. 6 illustrates an exemplary top view of the intercooler exchanger including an exemplary heat exchange medium flow path from an exemplary inlet to an exemplary exit. The exchange medium flow path may be reversed or otherwise redirected as dictated by a specific application. The heat exchange medium may be a liquid or may be other fluid, coolant, or cooling medium. As seen in FIG. 6, inlet 56 is separated into two inlets 56*a* and 56*b* at the heat exchanger, and one outlet 58. The flow direction may be reversed or may otherwise vary to accomplish a specific design purpose. Lines 60 indicate where the seals are located to divide the heat exchanger into first and second portions to permit the dual pass through the heat exchanger.

Figure 5:
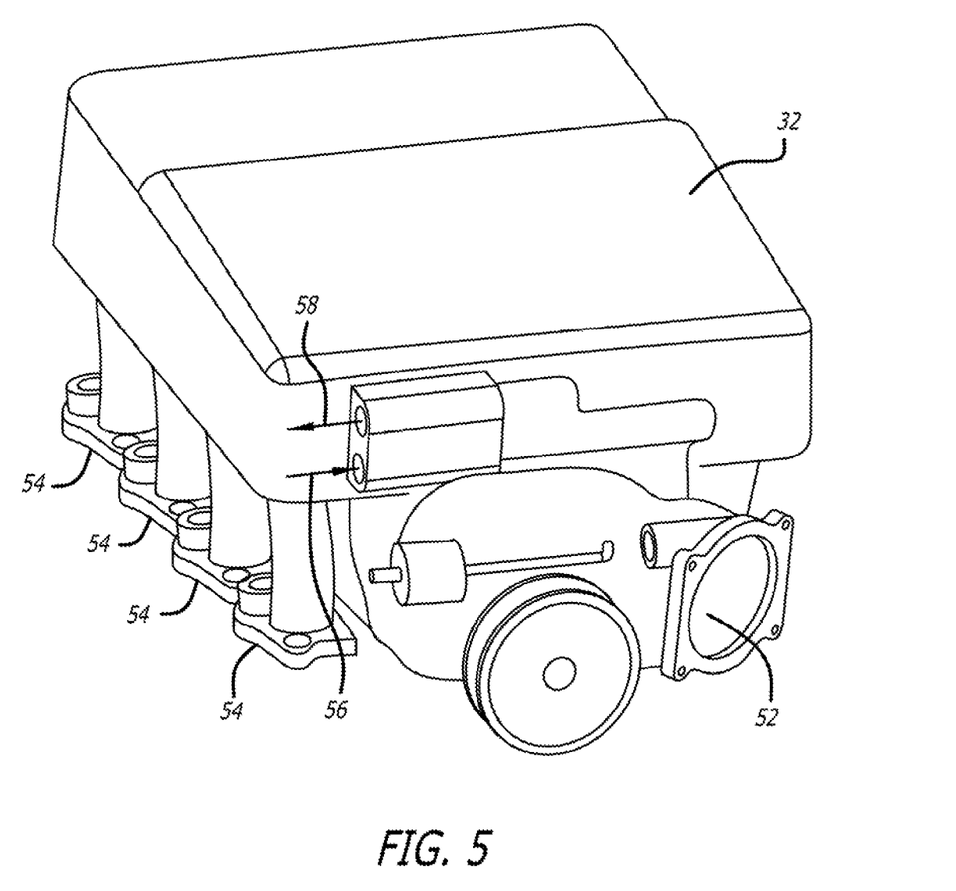
FIG. 5 illustrates an exterior perspective view of an exemplary enclosed dual pass intercooled supercharger according to embodiments described herein.

FIG. 5 illustrates an exemplary enclosure of the dual pass intercooler supercharger described herein. As can be seen, the intercooled supercharger housing comprises an air inlet 52, a plurality of air outlets 54 on opposing sides of the housing and a water inlet 56 and water outlet 58. In an exemplary embodiment, the air inlet 52, water inlet 56, and water outlet 58 are positioned on the same side of the housing 32. The water inlet 56 divides along its length to inject water through the intercooler at the opposing sides of the intercooler corresponding to the second portions of the intercooler, as discussed above. The water then travels along the length of the intercooler and combines at the opposing end before returning through the central portion of the intercooler and out the water outlet 58.

Not shown, but understood by a person of skill in the art, the water from and to the intercooler is pumped through the system. The water may be cooled by incoming air at a different location within the vehicle. For example, the water is piped to the front of the vehicle and is cooled from incoming air of the vehicle. The water is then piped past the exit of the supercharger. The air out of the compressor therefore passes the intercooler before entering the engine.

Exemplary embodiments are described herein in terms of a dual pass heat exchanger. A dual pass heat exchanger as it is used herein is defined as a heat exchanger where the fluid passing through the exchanger passes through the heat exchanger more than once. Preferred embodiments of the heat exchanger include an air to water heat exchanger where the air passes through the exchanger more than once.

Exemplary embodiments described herein provide a more compact intercooled supercharger. Exemplary embodiments of the disclosed intercooler are between the supercharger and the engine. The supercharger and intercooler may be integrated into a single housing or may be separate. Exemplary embodiments may use liquid or gas as the heat exchange medium. In an exemplary embodiment, water is used as the heat exchange medium, however, air or other heat exchange medium may also be used. Exemplary embodiments described herein are in terms of supercharger applications. The invention is not so limited and may be used in other applications in which a medium is compressed and the temperature is reduced. For example, exemplary embodiments may also be used with turbochargers.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A dual pass intercooled supercharger, comprising:
a housing;
a front drive, front inlet supercharger;
an intercooler in fluid communication with an exit of the supercharger, the intercooler configured as a dual pass heat exchanger having an airflow path from the supercharger that passes through the heat exchanger, defining a heat exchange area, more than once,
wherein the dual pass heat exchanger is a single heat exchanger in which a heat exchange medium is in fluid communication from an inlet to an outlet across the heat exchanger and defining a flow path perpendicular to the air flow path through the heat exchange area,
wherein the heat exchanger is configured such that the airflow path from the supercharger contacts a first portion of a heat exchange surface of the heat exchanger, leaves the heat exchange area, and reenters the heat exchange area to contact a second portion of the heat exchange surface separate from the first portion, the first portion and second portion of the intercooler overlap in a depth dimension along an air flow direction, and
wherein the second portion comprises two second portions, one of the two second portions is on a first side of the first portion and another of the two second portions is on a second side of the first portion opposite the first portion; and
a first seal to prevent air from bypassing the intercooler positioned between the first portion and the second portion of the heat exchanger.

2. The dual pass intercooled supercharger of claim 1, further comprising a second seal between an exterior edge of the intercooler and the housing.

3. The dual pass intercooled supercharger of claim 2, further comprising a first chamber between the supercharger and the intercooler, wherein the first seal circumscribes a portion of the first chamber.

4. The dual pass intercooled supercharger of claim 3, further comprising a second chamber between the intercooler and the housing.

5. The dual pass intercooled supercharger of claim 4, wherein the second chamber is coextensive with a portion of the intercooler second side, and the second seal circumscribes a portion of the second chamber.

6. The dual pass intercooled supercharger of claim 5, wherein a heat exchange medium inlet, a heat exchange medium outlet are on a same side of the dual pass intercooled supercharger.

7. The dual pass intercooled supercharger of claim 6, wherein the heat exchange medium inlet is adjacent the second portion and the heat exchange medium outlet is adjacent the first portion.

8. The dual pass intercooled supercharger of claim 7, wherein an air intake to the supercharger is on the same side of the dual pass intercooled supercharger as the heat exchange medium inlet and heat exchange medium outlet.

9. The dual pass intercooled supercharger of claim 8, further comprising a plurality of air outlets directed toward a lower side of the dual pass intercooled supercharger on opposing sides of the supercharger, and the intercooler is positioned above the supercharger.

10. The dual pass intercooled supercharger of claim 9, wherein the intercooler is configured such that air enters and leaves the intercooler on a lower side of the intercooler.

11. The dual pass intercooled supercharger of claim 10, wherein the heat exchanger is planar along an entire area with a constant thickness.

12. The dual pass intercooled supercharger of claim 1, wherein the heat exchanger is enclosed in a single housing.

13. The dual pass intercooled supercharger of claim 12, wherein the heat exchanger comprises a heat exchange surface enclosing a heat exchange fluid medium, the heat exchange surface defining the heat exchange area.

14. The dual pass intercooled supercharger of claim 13, wherein the air flow path is in opposite directions when contacting the first portion and contacting the second portion.

15. The dual pass intercooled supercharger of claim 14, wherein the heat exchange fluid medium is configured to move in opposite directions past the first portion and past the second portion.

16. The dual pass intercooled supercharger of claim 1, wherein an inlet and an outlet of the heat exchange fluid medium and an inlet of the air flow through the supercharger and the supercharger pulley are on a same side of the dual pass intercooled supercharger.

17. A method of compressing and cooling air to an engine intake, comprising:
 compressing the air in a front drive, front inlet supercharger;
 passing the air exiting the supercharger through a first portion of an intercooler in fluid communication with an exit of the supercharger;
 exiting the air from the first portion of the intercooler into a common chamber;
  passing the air from the common chamber through a second portion of the intercooler different from the first portion of the intercooler, the air directed in opposite directions when passing the first portion of the intercooler and when passing the second portion of the intercooler, wherein the intercooler defines a single heat exchanger in which
  a heat exchange medium is in fluid communication from an inlet to an outlet across the heat exchanger and defines a flow path perpendicular to the air flow path through the heat exchange area,
 a heat exchange medium of the intercooler is in fluid communication between the first portion and the second portion,
 a heat exchange medium flow path through the first portion and the second portion is perpendicular to an air flow path through the first portion and the second portion, and
 the second portion comprises two second portions, one of the two second portions is on a first side of the first portion and another of the two second portions is on a second side of the first portion opposite the first portion and a seal positioned between the first portion and the second portion prevents air from bypassing the intercooler.

18. The method of claim 17, further comprising passing cooled heat exchange medium into the intercooler adjacent the second portion through a first side of a housing enclosing the intercooler.

19. The method of claim 18, further comprising removing the warmed heat exchange medium from the intercooler adjacent the first portion through the first side of the housing.

20. The method of claim 19, further comprising supplying air to the supercharger through the first side of the housing.

* * * * *

US009683481C1

(12) EX PARTE REEXAMINATION CERTIFICATE (11447th)
United States Patent
Magana et al.

(10) Number: US 9,683,481 C1
(45) Certificate Issued: Jan. 15, 2019

(54) DUAL PASS INTERCOOLED SUPERCHARGER

(71) Applicant: Edelbrock, LLC, Torrance, CA (US)

(72) Inventors: Chad Magana, Lakewood, CA (US); Robert Simons, Irvine, CA (US)

(73) Assignee: EDELBROCK, LLC, Torrance, CA (US)

Reexamination Request:
No. 90/014,040, Oct. 27, 2017

Reexamination Certificate for:
Patent No.: 9,683,481
Issued: Jun. 20, 2017
Appl. No.: 15/077,830
Filed: Mar. 22, 2016

Related U.S. Application Data

(60) Provisional application No. 62/307,349, filed on Mar. 11, 2016.

(51) Int. Cl.
*F28D 7/16* (2006.01)
*F28F 9/02* (2006.01)
*F02B 29/04* (2006.01)
*F02B 33/38* (2006.01)
*F02M 35/116* (2006.01)

(52) U.S. Cl.
CPC ...... *F02B 29/0406* (2013.01); *F02B 29/0412* (2013.01); *F02B 29/0418* (2013.01); *F02B 29/0443* (2013.01); *F02B 29/0462* (2013.01); *F02B 29/0468* (2013.01); *F02B 29/0475* (2013.01); *F02B 33/38* (2013.01); *F02M 35/116* (2013.01); *F28D 7/1692* (2013.01); *F28F 9/0204* (2013.01)

(58) Field of Classification Search
USPC ............................................. 123/563, 599.1
See application file for complete search history.

(56) References Cited

To view the complete listing of prior art documents cited during the proceeding for Reexamination Control Number 90/014,040, please refer to the USPTO's public Patent Application Information Retrieval (PAIR) system under the Display References tab.

*Primary Examiner* — William C Doerrler (57) ABSTRACT

The dual pass intercooled supercharger includes a supercharger and intercooler. The system is configured such that air leaving the supercharger traverses the intercooler from one side to an opposing side two or more times.

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8 and 16 are cancelled.

Claims 1, 9 and 17 are determined to be patentable as amended.

Claims 2-7, 10-15 and 18-20, dependent on an amended claim, are determined to be patentable.

1. A dual pass intercooled supercharger, comprising:
   a housing;
   a front drive, front inlet supercharger;
   an intercooler in fluid communication with an exit of the supercharger, the intercooler configured as a dual pass heat exchanger having an airflow path from the supercharger that passes through the heat exchanger, defining a heat exchange area, more than once,
     wherein the dual pass heat exchanger is a single heat exchanger in which a heat exchange medium is in fluid communication from an inlet to an outlet across the heat exchanger and defining a flow path perpendicular to the air flow path through the heat exchange area,
     wherein the heat exchanger is configured such that the airflow path from the supercharger contacts a first portion of a heat exchange surface of the heat exchanger, leaves the heat exchange area, and reenters the heat exchange area to contact a second portion of the heat exchange surface separate from the first portion, the first portion and second portion of the intercooler overlap in a depth dimension along an air flow direction, and
     wherein the second portion comprises two second portions, one of the two second portions is on a first side of the first portion and another of the two second portions is on a second side of the first portion opposite the first [portion] *side*;
     *wherein an inlet and an outlet of the heat exchange fluid medium and an inlet of the air flow through the supercharger and a supercharger pulley are on a same side of the dual pass intercooled supercharger;* and
   a first seal to prevent air from bypassing the intercooler positioned between the first portion and the second portion of the heat exchanger.

9. The dual pass intercooled supercharger of claim [8] *6*, further comprising a plurality of air outlets directed toward a lower side of the dual pass intercooled supercharger on opposing sides of the supercharger, and the intercooler is positioned above the supercharger.

17. A method of compressing and cooling air to an engine intake, comprising:
    compressing the air in a front drive, front inlet supercharger;
    passing the air exiting the supercharger through a first portion of an intercooler in fluid communication with an exit of the supercharger;
    exiting the air from the first portion of the intercooler into a common chamber;
    passing the air from the common chamber through a second portion of the intercooler different from the first portion of the intercooler, the air directed in opposite directions when
    passing the first portion of the intercooler and when passing the second portion of the intercooler, wherein
    the intercooler defines a single heat exchanger in which a heat exchange medium is in fluid communication from an inlet to an outlet across the heat exchanger and defines a flow path perpendicular to the air flow path through the heat exchange area,
    a heat exchange medium of the intercooler is in fluid communication between the first portion and the second portion,
    a heat exchange medium flow path through the first portion and the second portion is perpendicular to an air flow path through the first portion and the second portion, and
    the second portion comprises two second portions, one of the two second portions is on a first side of the first portion and another of the two second portions is on a second side of the first portion opposite the first [portion] side and a seal positioned between the first portion and the second portion prevents air from bypassing the intercooler,
    *wherein an inlet and an outlet of the heat exchange fluid medium and an inlet of the air flow through the supercharger and a supercharger pulley are on a same side of the dual pass intercooled supercharger.*

* * * * *

(12) EX PARTE REEXAMINATION CERTIFICATE (11916th)
United States Patent
Magana et al.

(10) Number: US 9,683,481 C2
(45) Certificate Issued: Sep. 10, 2021

(54) DUAL PASS INTERCOOLED SUPERCHARGER

(71) Applicant: Edelbrock, LLC, Torrance, CA (US)

(72) Inventors: Chad Magana, Lakewood, CA (US); Robert Simons, Irvine, CA (US)

(73) Assignee: EDELBROCK, LLC, Torrance, CA (US)

Reexamination Request:
No. 90/014,570, Sep. 11, 2020

Reexamination Certificate for:
Patent No.: 9,683,481
Issued: Jun. 20, 2017
Appl. No.: 15/077,830
Filed: Mar. 22, 2016

Reexamination Certificate C1 9,683,481 issued Jan. 15, 2019

Related U.S. Application Data (60) Provisional application No. 62/307,349, filed on Mar. 11, 2016.

(51) Int. Cl.
*F02B 29/04* (2006.01)
*F02B 33/38* (2006.01)
*F02M 35/116* (2006.01)
*F28D 7/16* (2006.01)
*F28F 9/02* (2006.01)
*F02B 75/22* (2006.01)
*F28D 21/00* (2006.01)

(52) U.S. Cl.
CPC ...... *F02B 29/0406* (2013.01); *F02B 29/0412* (2013.01); *F02B 29/0418* (2013.01); *F02B 29/0443* (2013.01); *F02B 29/0462* (2013.01); *F02B 29/0468* (2013.01); *F02B 29/0475* (2013.01); *F02B 33/38* (2013.01); *F02M 35/116* (2013.01); *F28D 7/1692* (2013.01); *F28F 9/0204* (2013.01); *F02B 75/22* (2013.01); *F28D 2021/0082* (2013.01); *Y02T 10/12* (2013.01)

(58) Field of Classification Search
None
See application file for complete search history.

(56) References Cited

To view the complete listing of prior art documents cited during the proceeding for Reexamination Control Number 90/014,570, please refer to the USPTO's public Patent Application Information Retrieval (PAIR) system under the Display References tab.

*Primary Examiner* — Peter C English (57) ABSTRACT

The dual pass intercooled supercharger includes a supercharger and intercooler. The system is configured such that air leaving the supercharger traverses the intercooler from one side to an opposing side two or more times.

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8 and 16 were previously cancelled.

Claims 1-7, 9-15 and 17-20 are cancelled.

New claims 21-29 are added and determined to be patentable.

21. *A dual pass intercooled supercharger, comprising:*
   *a housing;*
   *a front drive, front inlet supercharger comprising two rotors with respective rotor axes;*
   *an intercooler in fluid communication with an exit of the supercharger, the intercooler configured as a dual pass heat exchanger having an airflow path from the supercharger that passes through the heat exchanger, defining a heat exchange area, more than once,*
   *wherein the dual pass heat exchanger is a single heat exchanger in which a heat exchange fluid medium is in fluid communication from an inlet to an outlet across the heat exchanger and defining a flow path perpendicular to the airflow path through the heat exchange area,*
   *wherein the heat exchanger is configured such that the airflow path from the supercharger contacts a first portion of a heat exchange surface of the heat exchanger, leaves the heat exchange area, and reenters the heat exchange area to contact a second portion of the heat exchange surface separate from the first portion, the first portion and second portion of the intercooler overlap in a depth dimension along an air flow direction,*
   *and wherein the second portion comprises two second portions, one of the two second portions is on a first side of the first portion and another of the two second portions is on a second side of the first portion opposite the first side;*
   *and a first seal to prevent air from bypassing the intercooler positioned between the first portion and the second portion of the heat exchanger, the first seal is mounted on a portion of the housing located below the heat exchanger,*
   *a first chamber between the exit of the supercharger and the heat exchanger, the heat exchanger having a length and a width and opposed top and bottom sides, the width of the heat exchanger being transverse to the rotor axes;*
   *wherein the bottom side of the heat exchanger lies in a plane along the entire width of the heat exchanger, and the bottom side of the heat exchanger is in direct contact with an upward-facing surface of the first seal;*
   *a second chamber on an opposite side of the heat exchanger from the first chamber, the second chamber located between the top side of the heat exchanger and an upper portion of the housing, the second chamber separating the top side of the heat exchanger and the upper portion of the housing such that, at a point along the heat exchanger's length where the first chamber is also located, there is separation between the top side of the heat exchanger and the upper portion of the housing along the entire width of the heat exchanger; and*
   *wherein the inlet and the outlet of the heat exchange fluid medium and an inlet of the air flow through the supercharger and a supercharger pulley are on a same side of the dual pass intercooled supercharger.*

22. *The dual pass intercooled supercharger of claim 21, wherein the housing is a single housing in which the heat exchanger is enclosed.*

23. *The dual pass intercooled supercharger of claim 22, wherein the heat exchanger is planar along the entire heat exchange area with a constant thickness.*

24. *The dual pass intercooled supercharger of claim 21, further comprising a second seal circumscribing the heat exchanger and sealing the heat exchanger along a perimeter of the housing.*

25. *The dual pass intercooled supercharger of claim 21, wherein the inlet of the heat exchange fluid medium is adjacent the second portion of the heat exchanger, and the outlet of the heat exchange fluid medium is adjacent the first portion of the heat exchanger.*

26. *The dual pass intercooled supercharger of claim 21, further comprising a plurality of air outlets directed toward a lower side of the dual pass intercooled supercharger on opposing sides of the supercharger, and the intercooler is positioned above the supercharger.*

27. *The dual pass intercooled supercharger of claim 26, wherein the intercooler is configured such that air enters and leaves the intercooler on a lower side of the intercooler.*

28. *The dual pass intercooled supercharger of claim 21, wherein the airflow path when contacting the first portion of the heat exchanger is in an opposite direction to the airflow path when contacting the second portion of the heat exchanger.*

29. *The dual pass intercooled supercharger of claim 28, wherein the heat exchange fluid medium is configured to move in opposite directions past the first and second portions of the heat exchanger.*

\* \* \* \* \*